Patented Oct. 23, 1928.

1,689,008

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATON OF DELAWARE.

ANTISEPTIC, ANTIFOULING, GERMICIDAL WATERPROOF COATINGS.

No Drawing. Application filed July 3, 1926. Serial No. 120,531.

My invention relates to compositions of matter to be used in coating, surfacing or sizing various objects, as with a paint or varnish, to render the surface to which said coatings are applied waterproof and destructive of bacterial, insect or animal life or vegetable growth, the principal constituent of which coating is a natural or artificial irreversible colloid in aqueous dispersion.

Such irreversible colloids in aqueous dispersion, as are adapted for use in my present invention, are the natural saps or exudations (natural latices) of rubber bearing plants, untreated or treated with suitable preserving agents, such as alkalies or formaldehyde. Synthetic dispersions of irreversible colloids in aqueous dispersion may, however, be readily made in any well known manner and used in the practice of my invention. For instance, rubber, cured or uncured or reclaimed, gums, or resins may be dissolved in one or more organic solvents, such as carbon-tetrachloride, benzol or gasoline and the water-insoluble content of the solution may then be dispersed into an aqueous colloidal form by agitation or mastication through rollers in the presence of and by the aid of water. Such synthetic colloids are within the purview of the present invention.

An object of my invention is to provide a composition of matter comprising a water-repelling vehicle combined with poisons, and/or antiseptic and/or growth preventative ingredients for the application to objects subjected particularly to aquatic life or growths, such as barnacles, sea worms, seagrass and other marine parasites and fungi.

A further object of my invention is to provide a flexible water-repellent coating composition comprising an irreversible colloid in aqueous dispersion and poisonous ingredients of the character above indicated, which may be used as a sizing or coating for materials wherein flexibility and waterproofing properties are both desired and to render such materials immune to insect or germ life.

A further object of my invention is to use rubber latex or similar materials as the essential water-repellent adhesive principle of my composition, the same to be mixed with various insecticides or other life or growth preventatives, for the purpose of affixing and retaining such poisonous ingredients to and on the objects on which my composition is sprayed or otherwise applied.

An object of my invention is to provide a coating, sizing or spray adapted to be applied to vegetable growth, such as trees, shrubs and grass for the purpose of destroying pestiferous or noxious life thereon, the poison or insecticide, when once applied, being to all intents and purposes permanently secured to and retained on the stalk or leaves of the vegetable growth so that it is not washed away therefrom by the rain or by water sprayed thereon.

A further object of my invention is to provide a paint suitable for coating the hulls of vessels and structural work to be submerged in water, which will prevent aquatic lift or growth from attaching itself to and injuring the objects coated therewith.

A further object of my invention is to provide an antiseptic paint suitable for the coating of the walls of a hospital or other rooms wherein cleanliness and sanitation are necessary or desirable and which will act to destroy parasitic, bacterial and noxious germ or vegetable life.

The poisonous materials above referred to need not necessarily be poisonous to human life but only to bacterial or germ life, or to creatures as belong to the pest, insect, bacterial or similar life noxious to man.

Since the uses to which my improved composition of matter are various, the ingredients and the proportions thereof to be mixed with one or more irreversible colloids in aqueous dispersion will vary considerably. Several compositions will, therefore, be set forth in detail below together with the manner of compounding the same, as guides to the way in which my invention may be put to practical use.

As an example of a sanitary paint the following may be given:

| | Parts by weight. |
|---|---|
| Calcium rosolate and/or calcium hydroxid | 10 |
| Water | 10 |
| Rubber latex | 2 |

As above indicated, calcium rosolate may be used alone or may be mixed with calcium hydroxid or the calcium hydroxid may be substituted for the calcium rosolate if a less active germicidal coating is desired, as for use in painting the walls of a dwelling. The percentages or proportions above specified are not to be construed as invariable for the quantity of any ingredient may be increased or diminished as may be found necessary for making a paint for a particular object or purpose. To the ingredients above specified may be added suitable pigments, such as whiting, china clay and other coloring materials, preferably inert, to give body or color or a desired degree of opacity to the coating. To the ingredients above specified may be also added other colloidal substances acting as supporting colloids and preferably in aqueous dispersion among which may be mentioned such hydrophillic colloids as the glues, casein, starch and similar ingredients. Such colloids, however, need not necessarily be irreversible colloids. They are preferably waterproof when dry or after subjection to the action of a precipitating or coagulating agent but the main or essential colloid in the composition should be an irreversible water-insoluble colloid in aqueous dispersion in order to attain the best results from the use of my invention.

As a spray for plant life, the following ingredients may be used:

| | Parts by weight. |
|---|---|
| Calcium arsenate | 10 |
| Water | 2,400 |
| Rubber latex | 16 |

The order of the mixture of these ingredients is not very important but I prefer to mix the calcium arsenate with the rubber latex until a smooth homogeneous mixture is obtained and to then add thereto water to about the extent above indicated. The proportions above given are applicable when a comparatively weak hydrated lime is used. When a strong or highly alkaline hydrated lime is employed, the proportion of water should be increased, dependent upon the quality of the lime and the particular use to which the product is to be put. Another example of a spraying composition having great adhesive properties, is given as follows:

| | Parts by weight. |
|---|---|
| Calcium arsenate | 20 |
| Casein | 3 |
| Borax | ¾ |
| Water | 4,000 |
| Rubber latex | 10 |

In compounding this composition the insecticidal or poisonous material is mixed with the hydrophillic colloid casein and borax in a pasty form. To that may be added rubber latex and thoroughly commingled therewith, after which this mixture may be diluted with water to the desired extent above indicated.

In these spraying materials, as well as in the sanitary paint above referred to, the active principle of the material to be sprayed or the paint to be applied is the irreversible colloid in aqueous dispersion, to wit, the rubber latex. If a suitable preservative be added to this colloid, it may be kept in this colloidal form for a comparatively long period provided the water content thereof is not allowed to evaporate.

When the insecticidal liquid is sprayed upon vegetation and the water of the colloid is absorbed or evaporated from the colloidal substance on the vegetation so sprayed, the irreversible or water-resisting content is thereby converted into a water-resisting glue which retains the poisonous ingredients on the vegetation from which it is not removed by the rain. This is of particular advantage in both the spray and the paint for by so embedding or retaining the poisonous ingredients on the painted surface or the sprayed vegetation, the poisonous material is retained on the wall or on the vegetation, for a long time as an active germicide or insecticide. The rain does not wash the composition from the foliage which may have been sprayed with the composition and the washing of the wall to keep it clean will be ineffective to dissolve the film and allow the germicide to be washed from the wall, for the film is waterproof.

As an example of an antifouling composition, the following is given:

| | Parts by weight. |
|---|---|
| Pulverized metallic copper | 10 |
| Boiled linseed oil | 10 |
| Bentonite or other colloidal clay | 5 |
| Rubber latex | 30 |

The preferred manner of mixing these ingredients is to thoroughly mix the copper or other suitable antifouling ingredients with the linseed oil, to then add to this mixture the clay which has been previously mixed with a sufficient amount of water to make a plastic or liquid composition, and to then add the latex to the other ingredients so mixed.

Other antifouling materials than pulverized metallic copper may be substituted therefor in the above composition. Such substitutes may include copper compounds, or zinc, lead or compounds of the same, compounds of mercury, cyanides, red lead, alcohol, poisons and radio-active substances. These various materials may be used singly or combined with material or synthetic lactices or water-repellant substances. To the ingredients above specified may also be added such materials as pulverized naphthalene, the various pitches and tars, and especially those containing phenol bodies, all of which are effective in the antifouling composition.

The linseed oil or any similar oily substitute therefor is not absolutely necessary unless the poisonous material to be contained in the final composition has a coagulating, insolubilizing or dehydrating effect or action on the latex or other non-aqueous colloid in aqueous dispersion. An oily or tarry ingredient when added appears to form a protective film around the particles of an insolubilizing agent and when a poisonous ingredient which is added to the paint, is a coagulant its action may be deterred or delayed for a time sufficient to enable one to readily spread the paint. After the coating of paint has thus been spread, the coagulant may become active and assist in the coagulation of the latex. Moreover, oils in the composition impart a certain amount of adhesiveness to the rubber latex and therefore resins, shellac and other water-repellant substances capable of being dispersed in water may also be added to the mixture and will form a part of the aqueous collodial dispersion of the coating compound.

When the composition is to be used as a marine paint, it is preferable to omit any proteinous or albuminous supporting colloids from the latex or aqueous dispersions of non-aqueous colloids because such materials may decompose under the action of water, and if a supporting colloid be found to be desirable it should be a colloid of an inert material, such as clay.

Although some of the uses of my improved composition as above disclosed are such as to make it difficult to vulcanize the coating, there are other uses, in which vulcanization of the coating is desirable and possible, and it is to be understood that suitable vulcanizing and accelerating agents may be incorporated into the compound in the course of making and compounding the same. If the objects on which the coating is applied are of such a nature or character as to make the heating thereof possible, a proper amount of sulphur may be added to the composition during the process of making or preparing the same. And if the aqueous dispersion or any of the ingredients of the paint be of such a character that sulphur or other vulcanizing agent normally chemically reacts thereon, the vulcanizing agent may be first intimately mixed with a suitable amount of oil or oily substances so that the particles thereof are covered with an oily or waxy film prior to their incorporation into the painting mixture to prevent or retard the coagulating effect of such ingredient until after the paint has been applied to the object to be coated.

When a water-resisting paint is desired for coating a wall or protecting the hull of a vessel, suitable vulcanizing and/or insolubilizing agents may be incorporated into the paint as above described or the paint without such agents may be applied to the surface as a film or coating and subsequently treated with such vulcanizing or insolubilizing agents in any suitable manner. In other words, I may effect the vulcanization and/or coagulation of the colloids in aqueous dispersion by subjecting the film to the action of a suitable liquid or gas, the chemical reaction of which upon the colloid in aqueous dispersion is to insolubilize or vulcanize it. Thus, such a freshly painted surface may be given a washing or a spraying or a brushing with weak acid solution or with a wash of formaldehyde or alcohol to dehydrate or insolubilize, or of sulphur chloride to vulcanize, the colloidal content of the paint so applied to the surface. Acid fumes may be adapted in some instances to accelerate the precipitation of the insoluble content of the colloid in aqueous dispersion and to vulcanize the coating.

Having thus described my invention, what I claim and desire to protect by Letters Patent of the United States is:

A composition of matter including an intimate mixture of a poisonous compound of arsenic substantially twenty parts by weight, casein substantially three parts by weight and rubber latex substantially ten parts by weight, said compound being dilutable with water up to four thousand parts by weight to provide a fluid which may be sprayed upon various objects to preserve the same from attack by noxious animal and vegetable life.

In witness whereof, I have hereunto set my hand this second day of July, 1926.

ARTHUR BIDDLE.